United States Patent Office 2,964,377
Patented Dec. 13, 1960

2,964,377

FLAMEPROOFING REACTION PRODUCT AND USE OF SAME

James R. Costello, Jr., Chicago Heights, Ill., assignor to Victor Chemical Works, a corporation of Illinois No Drawing. Filed Feb. 18, 1957, Ser. No. 640,614

10 Claims. (Cl. 8—116)

This invention relates to treating an anhydrous ammonia-phosphorus pentoxide reaction product with an aqueous solution of ammonium hydroxide, the reaction products produced by said treatment, and the utilization of the reaction products of said treatment in flameproofing cellulose fibers or fabric.

The term "cellulose" sometimes herein refers to cellulose fibers and/or fabric such as exempilfied by cotton fibers or fabric, paper, and the like.

The term "anhydrous ammonia-phosphorus pentoxide reaction product" as used herein refers to the reaction products produced by reacting (anhydrous) phosphorus pentoxide with an excess of anhydrous ammonia.

With regard to the chromatographic analyses, shown infra, which indicate the percentage of orthophosphate, lower polymer and higher polymer appearing in the ammoniated, anhydrous ammonia-phosphorus pentoxide reaction product, the procedure set forth in "Use of Paper Chromatography for Differential Analysis of Phosphate Mixtures," Analytical Chemistry, vol. 28, No. 7, page 1091 (July 1956), was followed.

It has been discovered that the reaction product produced by reacting an excess of anhydrous ammonia with phosphorus pentoxide may be modified by further treatment with a concentrated aqueous solution of ammonium hydroxide so as to produce a superior flameproofing product which may be applied to cellulose.

The anhydrous ammonia-phosphorus pentoxide reaction product may be produced by any one of several methods. For example, solid phosphorus pentoxide may be reacted with liquid anhydrous ammonia in the manner described in U.S. Patent No. 2,163,085, or by reacting a suspension of $P_2O_5$ in an inert liquid medium with an excess of gaseous anhydrous $NH_3$ as described in U.S. Patent No. 2,122,122, or, preferably, by burning elemental phosphorus with dry air to produce $P_2O_5$ substantially in vapor form and immediately reacting such $P_2O_5$ with gaseous anhydrous $NH_3$ in excess amount over that which will react with the $P_2O_5$, and separating the reaction product in the form of a finely divided white granular product. While such products have been produced and used commercially for some time, their exact chemical composition and structure is not known. However, it is known that such reaction products contain both ammoniacal nitrogen and nuclear or amide nitrogen components. Further, it is known that at least part of the reaction product is in a polymerized form. Theoretically, a large number of possible chemical structural formulas can be drawn for the same reacting proportions of anhydrous $NH_3$ and $P_2O_5$; it is highly probable that the reaction product is a mixture of several different compounds having different degrees of polymerization. Chemical analysis shows such reaction products to vary from about:

70–80% $P_2O_5$
5–10% nuclear or amide nitrogen; and
12–18% free or ammoniacal nitrogen.

Several typical analyses of such products are shown in Table I, infra.

TABLE I

| | A | B | C | D | E |
|---|---|---|---|---|---|
| | Percent | Percent | Percent | Percent | Percent |
| $P_2O_5$ | 73.55 | 73.65 | 77.4 | 74.5 | 75.0 |
| Amide N | 7.99 | 5.53 | 6.23 | 7.65 | 6.5 |
| Free N | 16.07 | 17.51 | 14.17 | 14.55 | 16.69 |
| Undetermined | 2.39 | 3.31 | 2.20 | 3.30 | 1.81 |

Such reaction products may be dissolved, but generally with some difficulty, in cold water, but on standing in water over night or when dissolved in hot water form viscous liquids. Such liquids when applied to cellulose fibers or fabric are known to have a flameproofing effect. However, these flameproofing products are not at all permanent and are completely removed from the treated fabric when the fabric is laundered.

It has now been discovered that when the above type of anhydrous ammonia-$P_2O_5$ reaction products are liquefied in a concentrated ammonium hydroxide solution, instead of water, the flameproofing properties of the liquefied, anhydrous ammonia-$P_2O_5$ reaction product are greatly increased. In addition, at the same time, the liquefied reaction product will have increased resistance to removal from the fabric by laundering operation.

The new flameproofing reaction product is made by suspending the anhydrous $NH_3$—$P_2O_5$ reaction product in a large volume of concentrated ammonium hydroxide solution and permitting the resulting mixture to stand over night or for a period sufficient to enable separation of the reacted mixture into two layers. The supernatant or upper layer or unreacted portion of the ammonium hydroxide solution may be decanted-off leaving the lower layer of the ammonium hydroxide modified, anhydrous $NH_3$—$P_2O_5$ reaction product in the form of a viscous liquid or gel.

It has been found that ammonium hydroxide solutions with an $NH_3$ content as low as 23% can be satisfactorily used, but an $NH_3$ concentration of about 28% appears to give optimum results.

For optimum results, the viscous liquid or gel should be promptly applied to the fabric, although satisfactory results may be effected in the event the ammoniated product ages for a few days, or longer.

Typical examples showing the preparation of the new ammonium hydroxide modified $NH_3$—$P_2O_5$ reaction product are as follows:

*Example I*

8,754 grams of an anhydrous $NH_3$—$P_2O_5$ reaction product (i.e., produced by burning elemental phosphorus with dry air to produce $P_2O_5$ substantially in vapor form, immediately reacting the $P_2O_5$ product with gaseous anhydrous $NH_3$ in excess amount over that which will react with the $P_2O_5$, and separating the reaction product in the form of a finely divided white granular product) having an analysis of 73.55% $P_2O_5$, 6.58% nuclear or amide nitrogen, and 13.22% free or ammonium nitrogen was stirred into 18,000 ml. of ammonium hydroxide (28% $NH_3$) solution and allowed to stand overnight at room temperature. The reacted mixture separated into two layers. The upper layer containing the excess unreacted ammonium hydroxide solution was decanted off leaving the viscous lower layer of the ammonium hydroxide modified flameproofing composition. The product analyzed 52.8% $P_2O_5$, 6.3% amide N, and 12.0% ammonium N.

A comparison of the above chemical analyses of the starting anhydrous $NH_3$—$P_2O_5$ reaction product and the ammonium hydroxide modified product shows that the starting reaction product has been significantly changed. Calculations of mole ratios show that the ammoniated or modified product contains 0.61 mole nuclear nitrogen and 1.15 moles ammonium nitrogen per mole of phosphorus, as compared to 0.45 mole nuclear nitrogen and 0.91 mole ammonium nitrogen per mole of phosphorus in the starting anhydrous $NH_3$—$P_2O_5$ reaction product. These results show that the reaction of ammonium hydroxide with the starting anhydrous $NH_3$—$P_2O_5$ reaction product serves to increase the nuclear and ammonium nitrogen of said product. Thus, the reaction of the ammonium hydroxide with the starting anhydrous $NH_3$—$P_2O_5$ reaction product is much more complex and involves more than the simple neutralization of any acidic radicals which might be present in the starting material.

Flameproofing tests on 8-ounce cotton fabric show the superiority of the ammoniated, anhydrous $NH_3$—$P_2O_5$ reaction product over the starting anhydrous $NH_3$—$P_2O_5$ product. For example: pieces of cotton fabric were dipped in aqueous solutions of the anhydrous $NH_3$—$P_2O_5$ reaction product and the new ammoniated, anhydrous $NH_3$—$P_2O_5$ reaction product; the impregnated pieces of fabric were wrung out and dried; and the fabrics were then cured for five minutes at 140° C. The test pieces of fabric were then rinsed with distilled water and laundered in a 0.5% solution of a commercial organic detergent (i.e., Igepon T-73) solution for 15 minutes at 140° F. The fabric treated with the anhydrous $NH_3$—$P_2O_5$ reaction product was not flame resistant when a lighted match was applied to a ¼-inch wide strip, whereas the fabric treated with the modified or ammoniated product was highly flameresistant when tested in a similar manner. Comparative results of flameproofing, using the vertical Bunsen burner test which is described later, show that cellulose fabric treated with the original anhydrous $NH_3$—$P_2O_5$ reaction product had a burning time of 10 seconds and a char length of 4⅝-inches after one laundering; whereas, the fabric treated with my new ammoniated, anhydrous $NH_3$—$P_2O_5$ reaction product had a burning time of only 6.5 seconds and a char length of 2⅞-inches after one washing. The latter test fabric, which was treated with the new ammoniated product, was still resistant to burning when a lighted match was applied to a ¼-inch wide strip, whereas the first test fabric lost its resistance to burning by the lighted match after one laundering. This illustrates the superior flameproofing quality of the ammonium hydroxide treated, anhydrous $NH_3$—$P_2O_5$ reaction product over the anhydrous $NH_3$—$P_2O_5$ reaction product that was not treated with ammonium hydroxide solution.

Chromatographic analysis of the above ammoniated, anhydrous $NH_3$—$P_2O_5$ reaction product indicates the distribution of the 52.8% $P_2O_5$ to be as follows:

| | Percent |
|---|---|
| As orthophosphate ($P_2O_5$ equivalent) | 4.1 |
| As lower polymer ($P_2O_5$ equivalent) | 5.2 |
| As higher polymer ($P_2O_5$ equivalent) | 43.5 |

The product is somewhat unstable to hydrolysis and reaches, substantially, an equilibrium mixture on standing for four weeks as follows:

| | Percent |
|---|---|
| As orthophosphate ($P_2O_5$ equivalent) | 14.5 |
| As lower polymer ($P_2O_5$ equivalent) | 24.3 |
| As higher polymer ($P_2O_5$ equivalent) | 14.0 |

While the freshly prepared ammoniated, anhydrous $NH_3$—$P_2O_5$ reaction product is preferred because of its more efficient flameproofing capacity, the results obtained with the aged product are still satisfactory; the aged product simply should be applied in larger add-on amounts to obtain equivalent flameproofing results.

*Example II*

In a manner similar to that set forth in Example I, 9,739 grams of the anhydrous $NH_3$—$P_2O_5$ reaction product was suspended in 20,000 ml. of ammonium hydroxide (28% $NH_3$) solution overnight. The ammoniated reaction product which contained 95% of the original $NH_3$—$P_2O_5$ reaction product settled out as a viscous or gelatinous layer. The supernatant excess ammonium hydroxide solution layer which contained 5% of the original $P_2O_5$ in solution was decanted off for reuse in a subsequent cycle.

The ammoniated, anhydrous $NH_3$—$P_2O_5$ gel product analyzed 50.9% $P_2O_5$, 5.5% nuclear N, and 11.8% ammonium N. Chromatographic analysis showed 5.3% orthophosphate $P_2O_5$, 14.5% pyro to tetraphosphate, and 31.1% higher polymer ($P_2O_5$ equivalent). The gel, upon standing for four weeks at room temperature, was filtered to remove a small amount of precipitated solids. Chromatographic analysis of the aged product showed 4.4% orthophosphate $P_2O_5$, 19.8% lower polymer $P_2O_5$, and 28.1% higher polymer $P_2O_5$.

Flameproofing tests on cotton fabric showed this product to be somewhat more effective than the product of Example I. For example, the treated cloth could be carried through four laundering cycles before the cloth lost any of its flameproof properties. The unwashed treated cloth analyzed 4.65% P and 2.39% N, and after the five laundering cycles the cloth contained 3.24% P and 0.30% N.

The flameproofing of cellulose fabrics is conducted as follows. A treating bath is prepared by dissolving or diluting the ammoniated, anhydrous $NH_3$—$P_2O_5$ reaction product in water. The amount of dilution is not critical; however, it is preferred, generally, to use about equal amounts of water and the flameproofing gel. The cellulose fibers or fabric is then dipped or saturated with the bath solution, drained or wrung free of excess solution, and dried at a temperature of about 100° C. The treated cellulose material is then cured at a temperature of approximately 120° to 150° C. for 2 to 15 minutes. For cotton fabrics or paper, it is preferred to cure the material for about 2-5 minutes at about 140° C. Without limiting the invention to any particular theory or mechanism, it is believed that the curing treatment aids in effecting a chemical combination or bonding between the hydroxyl groups of the cellulose molecule and some of the nuclear nitrogen or phosphorus-oxygen-phosphorus groups of the ammoniated $NH_3$—$P_2O_5$ product. However, it seems obvious that some type of chemical combination or bonding takes place since the treated fabric loses none of its soft feel or flexibility which might be expected in a simple coating operation. The cured cellulose material is then rinsed with water to remove the soluble portion of the flameproofing composition which is not permanently attached or combined with the cellulose fibers. This rinsing step generally removes from about 40-75% of the treating composition depending on the dilution and exact chemical characteristics of the ammoniated, anhydrous $NH_3$—$P_2O_5$ reaction product. Generally, it is desirable that the add-on or composition retained by the cellulose fibers should be about 7 to 15% of the weight of the fibers.

The effect of the curing step on the retention of the new flameproofing compound by the cellulose fibers is illustrated by the following tests:

*Example III*

Pieces of crepe paper were treated with a 50% aqueous solution of an ammonium hydroxide modified, anhydrous $NH_3$—$P_2O_5$ reaction product (as in Example II), and the pieces of paper were wrung out and dried at 100° C. for five minutes. The pieces of paper were individually cured for 5 minutes at temperatures of 120° C., 130° C., and 140° C., respectively. The pieces were then rinsed with distilled water to remove the soluble material, dried to constant weight in an atmosphere of 50% relative humidity, and the percent add-on determined. From an original add-on of approximately 22%, the paper cured at 140° C. had an add-on of 13.4% and had excellent flame resistance when tested with a lighted match. The paper cured at 130° C. had an add-on of 8.6% and had good flame resistance. The paper cured at 120° C. had an add-on of 3.7% and had only fair flame resistance. The originally treated paper which was simply dried at 100° C. failed to retain any of the flame-proofing composition after rinsing with the distilled water and readily burned when a lighted match was applied to a ¼-inch wide strip. These tests show that a curing temperature of at least 120° C. is necessary to effect some combination or bonding with the cellulose fibers. The tests also show that, preferably, a curing temperature of about 140° C. should be employed.

In testing the degree of flameproofness of the treated fabrics, a strip of the treated cloth 2½-inches wide and 12 inches long is suspended vertically. A Bunsen burner flame is then applied at the center of the bottom edge for a period of 12 seconds and the time required for the flame to extinguish itself within the 12-second period while the Bunsen flame is applied is recorded, and the length of the charred portion measured. This method of testing is fully described in Federal Specification CCC–191–b. Generally, a char length of less than 5 inches and a burning time of less than 10 seconds is considered as representing a satisfactory degree of flameproofness.

In view of the variation and uncertainty of the composition of the initial anhydrous $NH_3$—$P_2O_5$ reaction product and lack of knowledge of the exact reaction which takes place when treating such anhydrous $NH_3$—$P_2O_5$ reaction products with concentrated ammonium hydroxide solution, it appears necessary that the new flameproofing composition be described in terms of the process of making it, with some practical limitations on the amounts and ratios of phosphorus, nuclear nitrogen and ammonium nitrogen in both the starting anhydrous $NH_3$—$P_2O_5$ reaction product and the ammonium hydroxide modified product.

Starting anhydrous $NH_3$—$P_2O_5$ reaction products having total nitrogen to phosphorus (atomic) ratios of from 1.0–1.5 to 1 and ammonium nitrogen to total nitrogen (atomic) ratios of from 0.6–0.75 to 1 have been successfully used in preparing the flameproofing compositions of the present invention. Such starting reaction products are shown in Table I, supra. These starting products may be produced in accordance with procedures set forth in U.S. Patent Nos. 2,163,085, 2,122,122, and 2,717,198.

In the reaction of these starting materials with an excess of concentrated ammonium hydroxide solution, the amount of ammonium hydroxide which enters into the reaction depends on the chemical and structural composition of the starting material and, to some degree, the temperature and time of reaction. For example, starting materials containing different proportions of high and low polymer components will probably react with different amounts of ammonium hydroxide at different rates. The temperature at which the reaction is carried out should have some effect on the rate of reaction and possibly affects the degree of depolymerization which takes place. The reaction may take place at some phosphorus to oxygen to phosphorus bond since both amide nitrogen and ammonium nitrogen are introduced by the ammonium hydroxide treatment. The degree of depolymerization and the characteristics of the resulting reaction product probably depend on the nature of the nitrogen to phosphorus bonds in the starting anhydrous $NH_3$—$P_2O_5$ reaction product.

Several types of such bonds, theoretically, may be present, such as $N\equiv P=$; $H-N=P\equiv$;

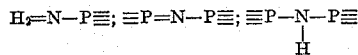

etc.

The anhydrous $NH_3$—$P_2O_5$ reaction products shown in Table I, supra, represent mixtures of components having two or more of such type bonds.

The new ammoniated or ammonium hydroxide modified reaction product may best be described as an ammonium hydroxide modified, anhydrous $NH_3$—$P_2O_5$ reaction product in viscous liquid or gel form in which the total nitrogen to phosphorus (atomic) ratio has been increased by a sum of at least 0.25, as a result of reacting the anhydrous $NH_3$—$P_2O_5$ reaction product with a concentrated ammonium hydroxide solution for a sufficient period to effect an increase by the sum of at least 0.25 in the nitrogen to phosphorus mole ratio without substantial change in the atomic ratio of ammonium nitrogen to total nitrogen.

While the flameproofing effect of the new product on cellulose fibers is greatly increased in permanency as compared with fabric treated with the known anhydrous $NH_3$—$P_2O_5$ products, as shown in the above examples, repeated laundering of fabric which has been treated with the new product tends to lower the amount of retained nitrogen in/on the fabric; after four or five laundering operations, the flame resistance of the fabric treated with the new product will be decreased a substantial amount. To offset this loss of flame resistance on laundering, it has been found that an after-treatment of the treated fabric with an aqueous solution of a resin of the class consisting of urea-formaldehyde, polyvinyl chloride, and methylol melamine-urea greatly improves the ability of the treated fabric to retain the ammonium hydroxide modified, anhydrous $NH_3$—$P_2O_5$ reaction product. Apparently, the aforesaid resins form a water-resistant coating which covers and protects the flameproof fabric during laundering operations. For example, the ammonium hydroxide modified, anhydrous $NH_3$—$P_2O_5$ reaction product may be modified as follows:

*Example IV*

In this modified procedure, a bath comprising a 50% aqueous solution of the ammonium hydroxide treated $NH_3$—$P_2O_5$ reaction product of Example II was employed in the initial treatment of cotton fabric. A number of 20" x 2½" eight ounce cotton fabric strips were immersed in this bath for about five minutes. The impregnated strips were then passed through a clothes wringer to remove the excess solution and were dried for about five minutes at 100° C. The treated, dried fabric strips were then cured at 140° C. for about five minutes and the soluble material removed by rinsing the fabric with distilled water. The dried treated pieces of fabric, at this stage, had an add-on of about 8–11%, by weight of the untreated fabric, of the ammoniated, anhydrous $NH_3$—$P_2O_5$ reaction product. Strips of fabric treated in this manner were then further treated with aqueous solutions or suspensions of certain resins. For example, several strips were saturated in a solution made by dissolving 40 grams of urea in 244 ml. of water and then dissolving 40 grams of methylol melamine in the same solution. The strips were then wrung out and dried for 10 minutes at 100° C. A 15–20% add-on of the resin was effected. With another set of strips, the after-treatment was effected by saturating the fabric in a solution of 200 grams of urea-formaldehyde solution in 180 ml. of water containing 4.5 grams of an acidic catalyst. The fabric strips were wrung out, dried for 5 minutes at 100° C. and cured for 5 minutes at 140° C. About 15% add-on of resin was effected. A third set of the strips were similarly treated with a 50/50 emulsion of polyvinyl chloride latex plus water. After drying and curing, a resin add-on of 9–17% was effected.

The above fabric test strips were then run through five laundering cycles and their flame resistance determined. Each laundering cycle consists of a 15-minute wash at 140° F. in a launderometer with a 0.5% solution of a commercial organic detergent (i.e., Igepon T–73 (sodium N-methyl N-oleyl taurate)), followed by rinsing and drying. The results are shown in Table II, infra. The headings "C.L." and "MT" in the table refer to char length and match test data, respectivelly.

TABLE II

| Flameproofing treatment | Percent Add-on | After Treatment | Percent Add-on | Washing cycles | | | |
|---|---|---|---|---|---|---|---|
| | | | | 1 | | 5 | |
| | | | | C.L. | MT | C.L. | MT[2] |
| $NH_4OH$ modified, anhydrous $NH_3$—$P_2O_5$ reaction products | 10.4 | None | | Inches 5 | + | Inches 4 | — |
| Do | 9.1 | Polyvinyl chloride | 8.6 | 3⅞ | + | 4 | + |
| Do | 8.8 | Urea-methylol-melamine | 19.9 | 2¼ | + | 3⅛ | + |
| Do | 9.1 | Urea-formaldehyde | 14.2 | 3⅜ | + | 3¼ | + |

[1] Burned to end.
[2] "—" and "+" indicate that the fabric was not and was, respectively, flame resistant.

The data in Table II show that the fabrics that were after-treated with the indicated protective resin coatings possessed better flame resistance after five laundering cycles, than the fabric that was not after-treated and was laundered once. However, as pointed out in Example II, fabric treated with the ammonium hydroxide modified, anhydrous $NH_3$—$P_2O_5$ reaction product continues to satisfactorily flameproof the fabric after 3 or 4 laundering cycles. Thus, Table II simply shows that added beneficial results are produced by the after-treatment, although the after-treatment is not an essential step in flameproofing cellulose in accordance with my invention.

The term "excess" in the following claims is intended to indicate that more ammonium hydroxide solution is added to the anhydrous ammonia-phosphorus pentoxide reaction product than is required to completely react with said reaction product. When the excess of ammonium hydroxide solution is added to the anhydrous ammonia-phosphorus pentoxide reaction product, more than mere neutralization results. Example I, supra, illustrates reacting an anhydrous ammonia-phosphorus pentoxide reaction product with an excess of ammonium hydroxide, thereby resulting in excess unreacted ammonium hydroxide solution.

The foregoing detailed description has been given for clearness of understanding only, and no unnecessary limitations should be understood therefrom, as modifications will be obvious to those skilled in the art.

I claim:

1. A product having flameproofing properties produced by a process comprising treating an anhydrous ammonia-phosphorus pentoxide reaction product with an excess of concentrated ammonium hydroxide solution, said excess causing the formation of a separate layer of viscous liquid reaction product, and removing said viscous liquid layer.

2. The method of producing a flameproofing product comprising treating an anhydrous ammonia-phosphorus pentoxide reaction product having ammonium and amide nitrogen with an excess of concentrated ammonium hydroxide solution, said excess causing the formation of a separate layer of viscous liquid reaction product, and removing said viscous liquid layer.

3. The method of producing a flameproofing product comprising reacting an anhydrous ammonia-phosphorus pentoxide reaction product having a total nitrogen to phosphorus atomic ratio of 1.0–1.5 to 1 and an ammonium nitrogen to total nitrogen atomic ratio of 0.6–0.75 to 1 with an excess of concentrated ammonium hydroxide solution having at least about 23% ammonia to increase the total nitrogen to phosphorus atomic ratio of said reaction product by a sum of at least 0.25, said excess causing the formation of a separate layer of viscous liquid reaction product, and removing excess unreacted ammonium hydroxide solution.

4. The method of producing a flameproofing product comprising reacting an anhydrous ammonia-phosphorus pentoxide reaction product having 70–80% $P_2O_5$, 5–10% amide nitrogen and 12–18% ammonium nitrogen with an excess of concentrated ammonium hydroxide solution having at least about 23% ammonia, said excess causing the formation of a separate layer of viscous liquid reaction product, and removing excess unreacted ammonium hydroxide solution.

5. The method of producing a flameproofing product comprising treating an anhydrous ammonia-phosphorus pentoxide reaction product having ammonium and amide nitrogen with an excess of concentrated ammonium hydroxide solution having at least about 23% ammonia, said excess causing the formation of a viscous liquid reaction product, and recovering said viscous liquid reaction product.

6. A flameproofing bath comprising an aqueous solution of the product of claim 1.

7. A product comprising cellulose and the product of claim 1 in an amount sufficient to act as a fire retardant therefor.

8. A product comprising paper and the product of claim 1 in an amount sufficient to act as a fire retardant therefor.

9. A product comprising cotton and the product of claim 1 in an amount sufficient to act as a fire retardant therefor.

10. A product comprising cellulose and the product of claim 1 in an amount sufficient to act as a fire retardant therefor, said product having an outer protective coating of a substantially water-insoluble resin.

References Cited in the file of this patent

UNITED STATES PATENTS

| 1,261,736 | Ferguson | Apr. 2, 1918 |
| 2,163,085 | Cuprey | Sept. 15, 1938 |
| 2,661,263 | Neilsen | Dec. 1, 1953 |